Jan. 4, 1944.
B. V. STOLL
2,338,142
GASOLINE FILTERING PROCESS
Filed Nov. 17, 1941
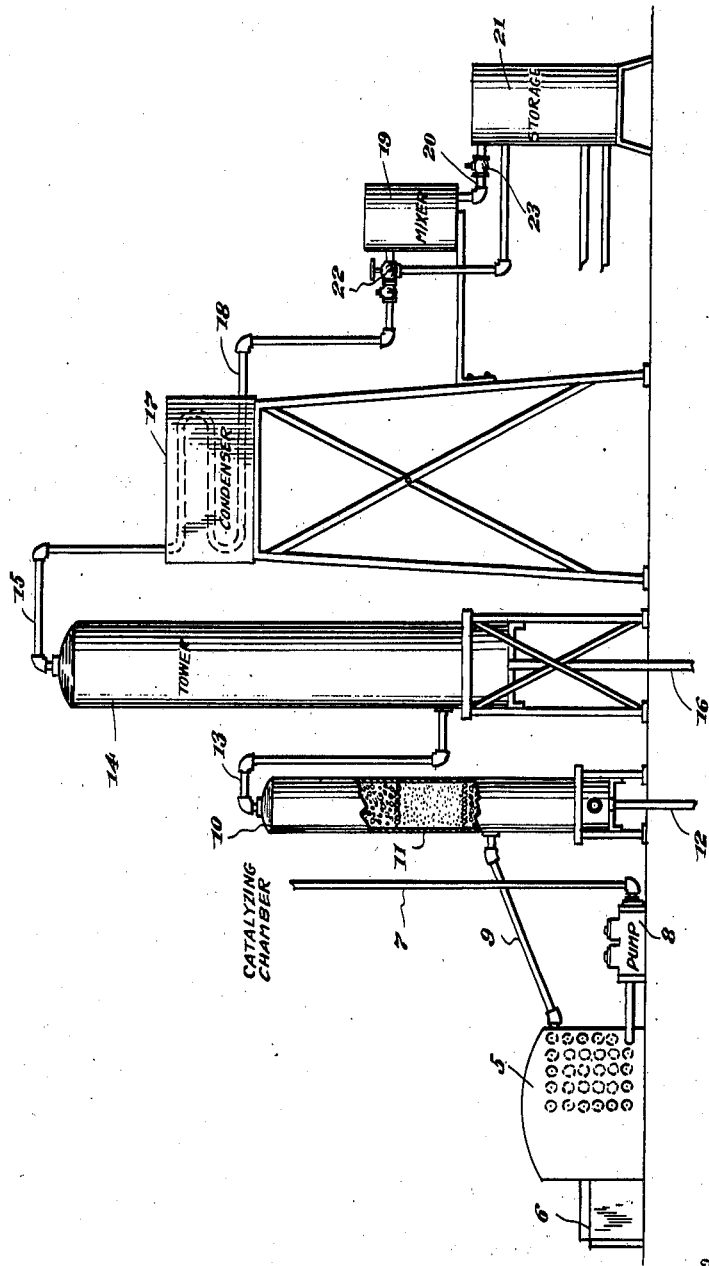
Inventor
BERRY V. STOLL
By Lacey & Lacey,
Attorneys Patented Jan. 4, 1944

2,338,142

UNITED STATES PATENT OFFICE 2,338,142

GASOLINE FILTERING PROCESS

Berry V. Stoll, Louisville, Ky.

Application November 17, 1941, Serial No. 419,497

1 Claim. (Cl. 196—96)

This invention relates to a system and apparatus for filtering gasoline of that general class shown and described in United States Letters Patent issued to me on the 1st day of April, 1930, under No. 1,752,709, the present invention being an improvement thereon.

The object of the invention is generally to improve and increase the efficiency of the system by catalyzing or treating gasoline in the vapor stage with a combination of absorbent materials or catalysts in which crushed bone is present, thereby to increase the activity of the catalyzer and produce a better grade of gasoline at less cost than heretofore.

A further object of the invention is to eliminate the step of filtering the oil during the liquid stage and to position the filtering medium within the catalyzing chamber so that the petroleum vapors from the still will come in direct contact therewith during the passage of said vapors through the catalyzing chamber.

A still further object is to provide a novel system or method of producing finished gasoline which consists in feeding petroleum vapors from a still into a combined filtering and catalyzing chamber, in which ground natural bone is present in addition to the main catalyzing agent, conducting the filtered vapor from the catalyzing chamber into a fractionating tower, removing heavy end point products from the lower portion of the tower, and conducting the petroleum products of better end point from the top of the tower into a condenser and thence through a caustic or alkali wash to a storage container.

Further objects and advantages will appear in the accompanying specification.

An apparatus for carrying out the improved method of treating gasoline is illustrated in the accompanying drawing wherein is disclosed a diagram of the apparatus.

Referring to the accompanying drawing, the numeral 5 indicates a pipe still of conventional construction and 6 a furnace by means of which the still is heated. The pipe 7 through which oil is delivered to the still leads from a suitable source of supply and in the length of said pipe is a pump 8 for applying pressure. A pipe 9 leads from the still 5 to a combined filtering and catalyzing chamber, indicated at 10. The catalyzing agent within the chamber 10 may include any natural oil sand from which oil is produced or natural earths which may have had the catalyzing effect on oils in their formation in the earth, such as clays, bauxite, bentonite or fuller's earth, together with natural crushed bone or product like activated carbon. The petroleum vapors from the still 5 are fed directly into the catalyzing chamber 10 where they pass through a suitable filter 11 charged with fuller's earth or the like and are subjected to the action of the catalyzing agent. In other words, the oil is filtered during the vapor stage as contradistinguished to the liquid stage.

Depending from the lower end of the catalyzing chamber 10 is a drain pipe 12 and communicating with the top of said chamber is a pipe 13 leading to a fractionating tower 14, from the upper and lower ends of which extend pipes 15 and 16. The pipe 15 leads to a condenser 17 so that fumes passing through this pipe will be cooled and condensed to form gasoline. The discharge end 18 of the pipe 15 projects from one side of the condenser and this discharge end 18 communicates with a mixer 19 in which the gasoline may be treated with an alkali wash, such as caustic. The mixer 19 is provided with an outlet 20 leading to a storage tank or container 21, and in the pipes 18 and 20 are pressure release valves 22 and 23 which hold the gasoline under pressure supplied by the pump 8. These valves are conventional release valves and the valve 22 should be set to release at a higher pressure than the valve 23. By this arrangement the petroleum fumes will be filtered in the catalyzing chamber and said fumes reduced to a liquid stage by the condenser 17, the liquid then passing through the mixing tank 19 to the storage tank 21 without being exposed to the atmosphere.

As a result of practical plant tests, it has been found that petroleum vapors distilling above 700° Fahrenheit can be greatly improved for use in automobile and Diesel engines by this method, and when gasoline alone is processed, the octane of the gasoline is raised and also the susceptibility to an ethyl-lead treatment increased. It has also been found that products heavier than gasoline treated by this method show a marked improvement in the operation of the fuel for Diesel engines and when a Diesel engine fuel is to be treated a larger percentage of bone and a smaller percentage of other catalyzing agents in the mix is advantageous. By adding bone charcoal to the crushed natural bone in the catalyzing chamber, the tendency of the gasoline to turn green is effectively overcome.

Natural bone blended with any of the beforementioned catalysts or their equivalents will greatly improve the action of the catalysts and increase the activity thereof by assisting said catalysts to perform their proper function.

It will thus be seen that one of the essential features of the present invention is the provision of a chamber packed with catalysts in which bone is present to catalyze the catalysts.

In carrying out the method or process, a high pressure may be maintained or it may be as low as ten or fifteen pounds at the outlet and approximately forty pounds at the discharge end of the pump, this pressure being only sufficient to force the liquid to be treated through the tubes where it is vaporized and reaches the catalyzing and filtering material entirely in a vapor stage. Gasoline so treated has an improved anti-knock advantage and Diesel oil so treated has a very greatly improved operating quality. In fact, when treating Diesel oils, it was found that crushed bone with or without other catalysts produced a marked improvement in the oil in that the exhaust from a Diesel engine using oils treated in accordance with the present method was practically odorless, thus obviating the main objection to the use of commercial Diesel operated buses. Furthermore, gasoline when so treated does not require as much ethyl fluid for blending into higher octane treated gasoline as other methods now in use. It will, therefore, be seen that there is produced a thoroughly efficient method of purifying gasoline by means of which a finished product is obtained which will remain sweet for an indefinite period and in which liability of the gasoline going off color is reduced to a minimum.

Having thus described the invention, what is claimed as new is:

The method of producing finished gasoline which consists in feeding petroleum vapor from a still directly into and upwardly through a combined filtering and catalyzing chamber in which bone charcoal and ground natural bone is present in addition to a catalyzing agent, conducting the vapor from the upper end of the catalyzing chamber into a fractionating tower, removing heavy end point products through the lower portion of the chamber, and conducting the petroleum products of better end point from the top of the tower into a condenser and thence directly into and through a caustic or alkali wash to a storage tank.

BERRY V. STOLL.